C. STICKLE.
THERMOSTATIC HEAT CONTROLLING MEANS.
APPLICATION FILED APR. 2, 1915.
1,208,691.
Patented Dec. 12, 1916.
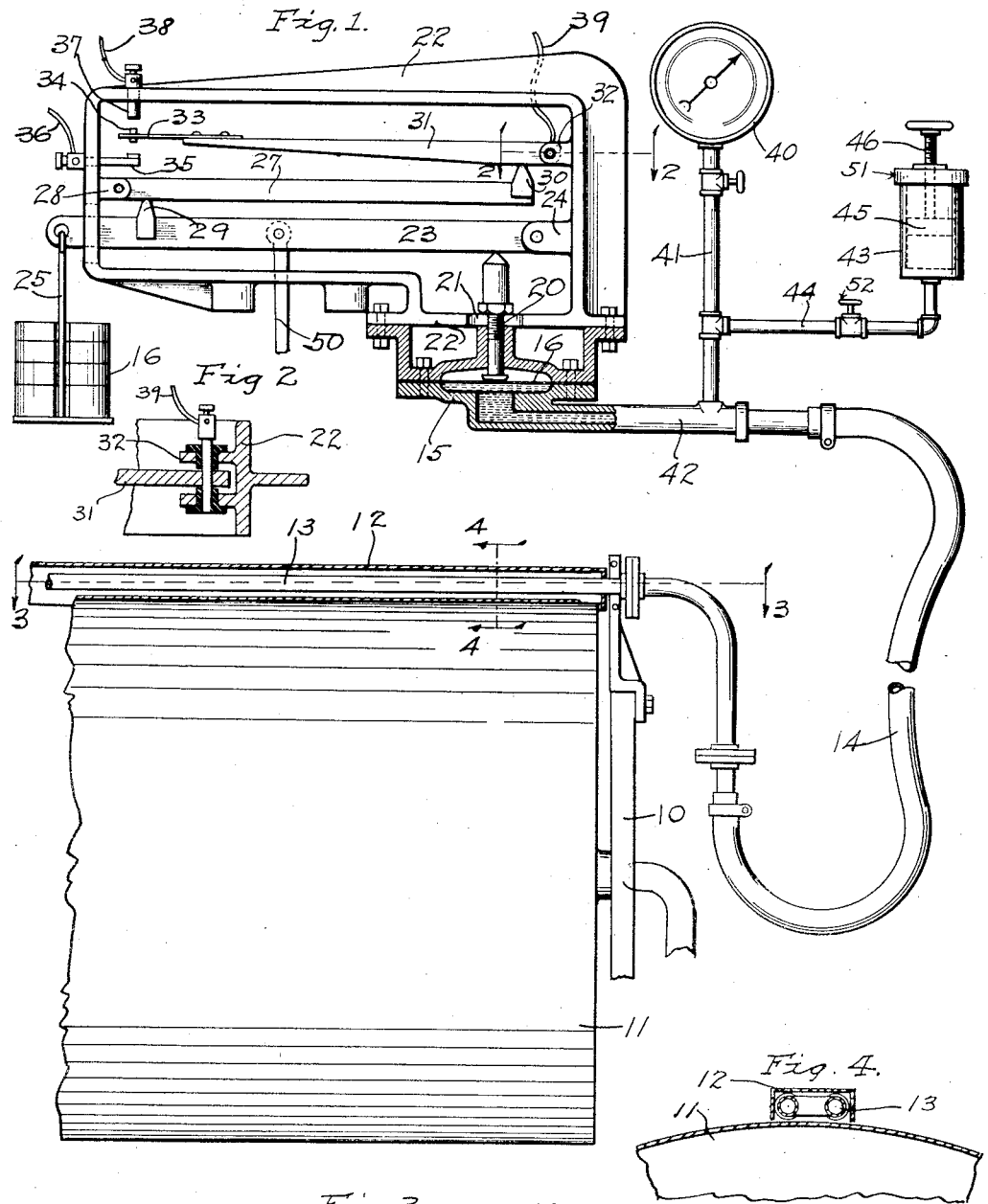

UNITED STATES PATENT OFFICE.

COLE STICKLE, OF INDIANAPOLIS, INDIANA.

THERMOSTATIC HEAT-CONTROLLING MEANS.

1,208,691.   Specification of Letters Patent.   Patented Dec. 12, 1916.

Application filed April 2, 1915. Serial No. 18,757.

*To all whom it may concern:*

Be it known that I, COLE STICKLE, a citizen of the United States, and a resident of Indianapolis, county of Marion, and State of Indiana, have invented a certain new and useful Thermostatic Heat-Controlling Means; and I do hereby declare that the following is a full, clear, and exact description thereof, reference being had to the accompanying drawings, in which like letters refer to like parts.

This invention has relation to means for thermally actuating a circuit breaker, particularly in the regulation of temperature or heating means by a thermostatic arrangement wherein a sealed liquid chamber is employed adapted to be heated and the liquid therein influences a diaphragm, which in turn actuates means for controlling the circuit breaker.

The object of this invention is to make such device accurate and sensitive to the slightest change of temperature of the liquid in the liquid chamber and also to open the circuit breaker so suddenly and to so large an extent that there can be no danger of fusing or burning the same out.

The object is accomplished chiefly by an arrangement for maintaining the liquid in the liquid chamber under pressure at all times, and therefore at such a low temperature that gases cannot be generated. In other words, the liquid in the liquid chamber is subjected to an initial pressure even before it has been heated, or subjected to a change of temperature, and since it is always under pressure, the liquid in said chamber is sensitive to the slightest change of temperature, and the circuit closer actuating means correspondingly actuated or influenced. Also, to make the device more accurate and sensitive, means is provided for compensating for any leakage of liquid or any variation in the quantity of the liquid in said chamber or in the capacity of the chamber containing the liquid so that the normal pressure of the liquid in said chamber will be uniform at all times. Also in the accomplishment of said object, a system of compound levers is employed to be actuated by a diaphragm influenced by the liquid in said chamber when expanded for controlling the circuit closer, and along with this is a provision of adjustable weights in connection with said levers for predetermining the pressure of the liquid in said chamber necessary to actuate the diaphragm and said compound levers.

The full nature of the invention will be understood from the accompanying drawings and the following description and claims:

In the drawings, Figure 1 is an elevation of a portion of a paper drying cylinder with the parts of the thermostatic arrangement shown in vertical section, parts being broken away. Fig. 2 is a section on the line 2—2 of Fig. 1. Fig. 3 is a section on the line 3—3 of Fig. 1. Fig. 4 is a section on the line 4—4 of Fig. 1.

It is immaterial to what heated means this thermostatic construction is applied, but it has been developed with particular reference for use in connection with paper making and drying machinery. Therefore, there is shown herein a part 10 of the frame of a paper making machine and a drying cylinder 11 to which heat is applied by any suitable heating means, not shown. A casing or chamber 12 is mounted over the cylinder or sheet of paper which passes over the cylinder and extends longitudinally of the cylinder and contains a water or liquid pipe 13 which is connected by a flexible tube 14 with a pipe 42 connected with a diaphragm chamber 15 in which the diaphragm 16 is mounted. Therefore, the parts 13, 14, 15 and 16 make a close fluid tight chamber and it is filled with liquid so that when the temperature is about normal the diaphragm will be in straight normal position, but when the temperature of the liquid rises, the volume of liquid will correspondingly increase and actuate or elevate the diaphragm. Such movement of the diaphragm will transmit power through a rod 20 which rests on the diaphragm and extends vertically upward out of it through an opening 21 in a lever frame 22 and into contact with a lower lever 23. This lever is fulcrumed at one end to a bracket 24 extending from said lever frame. The other end of the lever 23 is free and carries a pendulum 25 on which a number of weights 26 may be placed, like a weighing scale. Above said lever or beam 23 there is a thermostatic lever 27 fulcrumed at one end on a bracket 28 at the end of the frame 22 opposite the bracket 24 and near the fulcrum of said lever 27 it is engaged on the underside by an upwardly projecting post 29 on the lever 23. There is also a post 30 on the other end of said lever 27 which engages the underside of a lever 31 fulcrumed at one end on a bracket 32 in the frame and near the post 30. A spring 33 is secured on the free end of the lever 31 and it has contact points 34 adapted when in its lower position to engage the terminal 35 which is connected with a line 36 and when the lever 31 is in its upward position the contact 34 is adapted to engage the terminal 37 on line 38. The lines 36 and 38 extend to some suitable electrically operated means for shutting off and turning on the heat supply to the cylinder 11, which means, however, is not here shown, the other end of each of said circuits being formed by a line 39 which is connected with the bracket 32 of the frame.

A pressure gage 40 is connected by a pipe 41 with the tube 42 leading from the tube 14 to the diaphragm chamber. Said pipe 41 is also filled with the liquid which is in the liquid chamber heretofore described.

In operation the expansion of the liquid in said liquid chamber by reason of rising temperature is transmitted through the levers 23 and 27 and 31 so that the contact 34 will engage terminal 37 and shut off the heat. On the contrary when the temperature becomes too low, the contact on the end of the lever 31 will disengage the terminal 37 and move into contact with the terminal 35 and turn on the heat. The object of the continuous leverage is to cause a difficult making and breaking of the circuit so that there will be no arcing. Said thermostatic levers are in this construction controlled or regulated by the weights 26 so as to make it operate to shut off or turn on the heat at the desired temperatures. Therefore, there is herein provided a liquid thermostat which can be operated by a pressure at any desired temperature through the instrumentality of adjustable weights acting through a lever on the diaphragm. In operation said device, therefore, is a very sensitive one so that the difference of a half an ounce of pressure will cause the device to act.

In order that the device may be thoroughly sensitive and accurate, it is necessary that the volume of liquid in the sealed liquid chamber shall be maintained uniform as to quantity. If there be any leakage or loss of such liquid by any means, it may be compensated by an emergency valve which consists of a closed cylinder 43 on a pipe 44 connected with the pipe 41 or with said liquid chamber in any suitable way. The cylinder 43 has a piston 45 in it on the end of a set screw 46. The portion of the cylinder 43 below the plunger 45 and the pipe 44 are filled with liquid and constitute a portion of the total liquid chamber. If the liquid is diminished in quantity, the loss of pressure therein will be indicated by the gage 40 and by tightening down the screw 46 the volume of the liquid in the liquid chamber will be correspondingly reduced so as to raise the pressure of the liquid therein to the normal point, as indicated by the gage 40.

For absolute safety and accuracy another means for controlling the shutting off and turning on of the heat is provided besides the electrical means indicated. Thus a bar 50 is connected with the lever 23 and extends to the valve or other means, not shown, for controlling the heat supply so that when said lever 23 rises the valve, not shown, will be closed and the heat shut off and the contrary movement will open the valve.

Pipe 44 has in it a valve 52. The cap 51 of the cylinder 43 through which the screw 46 extends is removable. This enables the liquid chamber in pipe 42 to be charged, and even supplied with liquid when the said pipe is under pressure. The valve 52 is closed and the cap 51 in cylinder 43 is opened, and additional fluid is introduced into the cylinder 43 and the cap 51 replaced and the valve 52 then opened. This can be done while the device is under pressure. The plunger 45 is then screwed down, in order to adjust the pressure in the liquid chamber to a nicety. Then valve 52 is closed and the device is ready to operate.

The invention claimed is:

1. A thermally actuated circuit closer including a circuit closer, a closed liquid filled chamber adapted to be influenced by heat, means actuated by the expansion or contraction of the liquid in said chamber for controlling the circuit closer, a cylinder connected with said liquid chamber, and a longitudinally adjustable plunger therein for closing said cylinder and varying the capacity of said liquid chamber so as to maintain a uniform pressure therein.

2. A thermally actuated circuit closer including a circuit closer, a closed liquid filled chamber adapted to be influenced by heat, means actuated by the expansion or contraction of the liquid in said chamber for controlling the circuit closer, a cylinder connected with said liquid chamber and located on a higher level than said chamber, a pipe connecting the lower part of the cylinder with said liquid chamber, a valve in said pipe, a plunger in said cylinder, and a removable cap on the upper end of said cylinder, whereby said liquid chamber can be charged with liquid through said cylinder and while the pressure is acting on the fluid in said chamber.

In witness whereof, I have hereunto affixed my signature in the presence of the witnesses herein named.

COLE STICKLE.

Witnesses:
J. H. WELLS,
R. G. LOCKWOOD.